United States Patent Office 2,703,814
Patented Mar. 8, 1955

2,703,814

PROCESS OF PREPARING ORGANIC PHOSPHORUS COMPOUNDS

William T. Dye, Jr., Dayton, Ohio, assignor to Monsanto Chemical Company, St. Louis, Mo., a corporation of Delaware No Drawing. Application March 26, 1952, Serial No. 278,757

9 Claims. (Cl. 260—551)

The present invention relates to organic compounds of phosphorus and deals more particularly with methods of preparing quaternary phosphonium compounds.

Quaternary phosphonium halides generally are prepared by the addition reaction of trisubstituted phosphines with organic compounds having a halogen atom attached to an aliphatic carbon atom. The addition reaction is often quite vigorous and in order to effect moderation, it has been customary to conduct it in the presence of ether or alcohol as solvents. While ether has been a satisfactory solvent in laboratory practice, its use requires commercially unfeasibly long reaction times. Often, days were required to effect in ether a reaction which was vigorous and exothermic in the absence of ether. The use of alcohol as a reaction moderator has also been unsatisfactory in that a number of tri-substituted phosphines, particularly those containing nitrogen, react with the alcohol (see, e. g., Michaelis and Luxembourg, Berichte 28, 2208 (1905)). Also, even when the reactants are not affected by the alcohol, the use of this solvent is undesirable in that the phosphonium compounds, being alcohol-soluble, are difficultly isolated from the alcoholic reaction mixtures. Generally, crystallization of the phosphonium halides from such mixtures requires large excesses of ether—often it is necessary to use ten or twenty times as much ether in the crystallizing step as the quantity of alcohol employed in the addition step. Ethers are also undesirable in that rather than preferentially absorbing atmospheric moisture, they are hydrophobic to the extent that the readily deliquescent phosphonium compounds, instead of the solvent, tended to absorb any moisture present.

An object of the invention is the provision of an improved process for the manufacture of quaternary phosphonium halides. Another object of the invention is to reduce the reaction time while effecting the smooth addition reaction of trisubstituted phosphines and certain organic halides. Still another object of the invention is the easy isolation of quaternary phosphonium halides from a reaction mixture containing the same.

These and other objects of the invention hereinafter defined are provided by the following invention wherein the addition reaction of said trisubstituted phosphines and said organic halides is effected in the presence of dioxane as the reaction solvent. I have found that not only does the use of dioxane result in a material decrease in reaction time, but it also facilitates isolation of the quaternary phosphonium halides. While crystallization of the quaternary product from prior solvents was often very tedious, by the present process the product crystallized from the reaction mixture as soon as the heated reaction product had cooled.

The present process is applicable to the production of quaternary phosphonium compounds generally, by the addition reaction of trisubstituted organic phosphines, e. g., trialkyl phosphines such as trimethyl, tributyl, tridecyl or diethyl butyl phosphine, the triaryl phosphines such as triphenyl, tri-p-tolyl or trinaphthyl phosphines, the mixed alkyl aryl phosphines such as dimethyl phenyl phosphine, tris(dialkylamino)phosphines (hexaalkylphosphorous triamides) and the mixed dialkylamino alkyl or aryl phosphonous diamides such as benzenephosphonous dipiperidide or derivatives of such phosphines containing substituents which are inert during the reaction conditions such as the alkyl, ar-halogen or alkoxy radicals, with organic chlorides or bromides which are free of non-benzenoid unsaturation and in which halogen is attached to an aliphatic carbon, e. g., the alkyl halides such as methyl, isopropyl, n-hexyl, lauryl or octadecyl chloride or bromide, cyclohexyl bromide, benzyl chloride, 2-phenethyl chloride, etc. The present process is very advantageously employed with reactions involving aralkyl chlorides or bromides or derivatives thereof containing ar-substituents which are inert under the reaction conditions employed, inasmuch as the use of such halides with the tri-substituted phosphines generally requires external heating and results in products which are extremely difficult to handle and to crystallize from such solvents as ether, alcohol or acetone. Particularly tedious to execute under customarily employed conditions are reactions involving benzyl halides having the formula

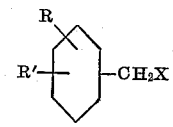

in which R and R' are selected from the class consisting of hydrogen, chlorine, bromine and alkyl radicals of from 1 to 5 carbon atoms and X is a halogen selected from the class consisting of chlorine and bromine, with trisubstituted phosphines having the formula

in which Y, Y' and Y'' are selected from the class consisting of alkyl and dialkylamino radicals in which the alkyl radical has from 1 to 5 carbon atoms. As examples of useful benzyl halides may be mentioned benzyl chloride, benzyl bromide, 2,4-dichlorobenzyl chloride, 2-chloro-4-methylbenzyl halide, 4-n-butylbenzyl chloride, 4-n-amyl-2-chlorobenzyl bromide, 2-ethylbenzyl chloride, etc. Useful phosphines having the above formula include trimethylphosphine, tri-n-amylphosphine, diethylpropylphosphine, hexamethylphosphorous triamide, hexa - n - butylphosphorous triamide, hexaisoamylphosphorous triamide, benzenephosphonous dipiperidide, etc.

The invention is further illustrated, but not limited, by the following examples.

Example 1

A mixture consisting of 40.7 g. hexamethylphosphorous triamide, 31.6 g. freshly distilled benzyl chloride and 150 cc. sodium-dried dioxane was refluxed, with stirring, for 2.5 hours. The reaction mixture was then cooled, diluted to 500 cc. with dioxane, dissolved in chloroform and reprecipitated with hot dioxane to yield 33 g. of white platelets of the substantially pure benzyltris(dimethylamino)phosphonium chloride, melting sharply at 209–10° C., and analyzing as follows:

|     | Found | Calcd. for $C_{13}H_{25}N_3PCl$ |
| --- | --- | --- |
| % Cl | 11.87 | 12.23 |
| % N | 14.63 | 14.51 |

Example 2

This example shows the great reduction in reaction time effected by using dioxane, instead of ether, as a solvent.

A mixture consisting of 40.7 g. hexamethylphosphorous triamide, 40.3 g. 2-chlorobenzyl chloride and 200 cc. dry dioxane was refluxed, with stirring, for 7 hours. Two hundred cubic centimeters of dioxane was then added to the reaction mixture and the whole was allowed to stand over night. The white prisms were filtered, dissolved in hot chloroform, precipitated with dioxane, and dried, yielding 60 g. (74% of theoretical yield) of 2-chlorobenzyltris(dimethylamino)phosphonium chloride, M. P. 233–5° C.

A mixture consisting of 25.8 g. 2-chlorobenzyl chloride and 25.4 g. hexamethylphosphorous triamide dissolved in 200 cc. of ether was allowed to stand for 3 weeks at ordinary room temperature. The needles were filtered off, rinsed with dioxane, then dissolved in chloroform and reprecipitated from hot dioxane. The resulting slurry of fine crystals was then filtered, rinsed with dioxane and dried. There was thus obtained 12.3 g. of the substantially pure 2-chlorobenzyltris(dimethylamino)phosphonium chloride, M. P. 234–5.5° C. and analyzing as follows:

|  | Found | Calcd. for $C_{13}H_{24}N_3PCl_2$ |
|---|---|---|
| % Ionic chlorine | 11.28 | 10.93 |
| % Total chlorine | 21.02 | 21.87 |
| % N | 12.99 | 12.96 |

*Example 3*

Twenty-four and seven tenths grams of hexaethylphosphorous triamide, 29.2 g. 3,4-dichlorobenzyl chloride and 100 cc. sodium-dried dioxane were mixed and heated to gentle reflux. After refluxing for five hours without precipitation the mixture was allowed to stand over night, during which time elongated platelets precipitated. These were filtered and washed, first with dioxane and then with ether; M. P. 140–160° C. Two repeated recrystallizations from dioxane and ether gave 22.5 g. crude 3,4-dichlorobenzyltris(diethylamino)phosphonium chloride, M. P. 145° C.–160° C. The wide melting range was due to impurities in the hexaethylphosphorous triamide.

*Example 4*

A mixture consisting of 40.7 g. hexamethylphosphorous triamide, 40.3 g. freshly distilled 4-chlorobenzyl chloride and 100 cc. dry dioxane was refluxed for 3 hours, then diluted to 400 cc. with dioxane and allowed to cool. The crystals were filtered off and recrystallized twice from chloroform and dioxane, yielding 46 g. of the substantially pure 4 - chlorobenzyltris(dimethylamino)phosphonium chloride, M. P. 211–2° C.

*Example 5*

This example shows the saving of time which results by effecting the reaction of a trialkylphosphine with benzyl halides in dioxane solution.

3,4-dichlorobenzyltri-n-butylphosphonium chloride was prepared by refluxing a solution of 10.1 g. (0.05 mole) tri-n-butylphosphine, 15.6 g. (0.08 mole) 3,4-dichlorobenzyl chloride, and 100 cc. sodium dried dioxane, in a stream of dry nitrogen. White needles began to separate after 35 minutes, and the charge quickly set to a thick slurry. Although reaction probably was nearly complete at this point, another 100 cc. dioxane was added; and refluxing was continued for another 3½ hours. The mixture was cooled and the solid filtered with suction, rinsed first with dioxane and then with ether, and dried over sulfuric acid. The product, tiny elongated plates, weighed 19.1 g. (96% of theory), had M. P. 188.3–8.9° C., and analyzed 8.78 per cent Cl⁻ and 7.38 per cent P (Calcd. for $C_{19}H_{32}Cl_2P$, 8.92 per cent Cl⁻ and 7.79 per cent P). Recrystallization from dioxane raised the melting point slightly to 193.0–3.2° C. (corr.).

Benzyltri-n-butylphosphonium chloride was prepared by allowing a solution of 54 g. (0.27 mole) tri-n-butylphosphine, 44 g. (0.35 mole) freshly distilled benzyl chloride, and 100 cc. ether to stand for four days at room temperature. The white solid was filtered, rinsed with ether, dissolved in a little absolute ethanol, and precipitated with a large volume of ether. There was obtained 18 g. of product, M. P. 161.4–1.8° C., and analyzing 10.78 per cent ionic chlorine (Calcd. for $C_{19}H_{34}ClP$, 10.78 per cent). Another 25 g. of product slowly precipitated from the filtrate during several months of further standing. The compound dissolves readily in hot dioxane, from which it precipitates on cooling as small, white, diamond-shaped plates, m. 164.3–4.5° C. (corr.).

The present invention is a continuation-in-part of my application Serial No. 223,449, filed April 27, 1951.

What I claim is:

1. The method of preparing quaternary phosphonium compounds having the formula

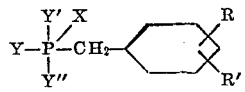

wherein Y, Y′ and Y″ are selected from the class consisting of alkyl and dialkylamino radicals in which each alkyl radical has from 1 to 5 carbon atoms, X is a halogen selected from the class consisting of chlorine and bromine and R and R′ are selected from the class consisting of hydrogen and chlorine, which comprises heating, in the presence of dioxane as a solvent, a benzyl halide having the formula

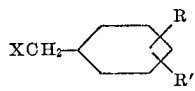

in which R and R′ are selected from the class consisting of hydrogen and chlorine with a phosphine compound having the formula

in which Y, Y′ and Y″ are selected from the class consisting of alkyl and dialkylamino radicals in which each alkyl radical has from 1 to 5 carbon atoms, allowing the resulting reaction mixture to cool, and recovering said phosphonium compound from the resulting reaction product.

2. The method which comprises heating benzyl chloride, in dioxane solution, with a hexaalkylphosphorous triamide in which each alkyl radical has from 1 to 5 carbon atoms, and recovering a crystalline phosphonium chloride from the resulting reaction product.

3. The method which comprises heating ar-chlorobenzyl chloride, in dioxane solution, with a hexaalkylphosphorous triamide in which each alkyl radical has from 1 to 5 carbon atoms, and recovering a crystalline phosphonium chloride.

4. The method which comprises heating ar-dichlorobenzyl chloride, in dioxane solution, with a hexaalkylphosphorous triamide in which each alkyl radical has from 1 to 5 carbon atoms and recovering a crystalline phosphonium chloride from the resulting reaction product.

5. The method which comprises heating benzyl chloride, in dioxane solution, with a trialkylphosphine in which each alkyl radical has from 1 to 5 carbon atoms and recovering from the resulting reaction product a crystalline trialkylbenzyl-phosphonium chloride in which each alkyl radical has from 1 to 5 carbon atoms.

6. The method which comprises heating hexamethylphosphorous triamide with benzyl chloride in dioxane solution and recovering crystalline benzyltris(dimethylamino)phosphonium chloride from the resulting reaction product.

7. The method which comprises heating 2-chloro benzyl chloride with hexamethylphosphorous triamide in dioxane solution and recovering crystalline 2-chlorobenzyltris(dimethylamino)phosphonium chloride from the resulting reaction product.

8. The method which comprises heating 3,4-dichlorobenzyl chloride with hexamethylphosphorous triamide in dioxane solution and recovering crystalline 3,4 - dichlorobenzyltris(diethylamino)phosphonium chloride from the resulting reaction product.

9. The method which comprises heating tri-n-butylphosphine with benzyl chloride in dioxane solution and recovering benzyltri-n-butylphosphonium chloride from the resulting reaction product.

References Cited in the file of this patent

UNITED STATES PATENTS

| 2,437,797 | Walling | Mar. 16, 1948 |

FOREIGN PATENTS

| 201,549 | Switzerland | Mar. 1, 1939 |

OTHER REFERENCES

Michaelis et al.: "Ber. deut. Chem.," vol. 28 (1895), pp. 2205–11.

Michaelis: "Liebig's Annalen," vol. 326 (1903), pp. 169 and 170.

Koslolapoff: "Organo-Phosphorus Compounds," October 12, 1950, pp. 78, 79, 81, 326 and 327.